UNITED STATES PATENT OFFICE.

MAURICE BARNETT AND LOUIS BURGESS, OF NEW YORK, N. Y.

ART OF PRODUCING ALUMINA.

1,252,384.      Specification of Letters Patent.      Patented Jan. 8, 1918.

No Drawing.      Application filed December 18, 1916. Serial No. 137,715.

*To all whom it may concern:*

Be it known that we, MAURICE BARNETT and LOUIS BURGESS, citizens of the United States, residing at New York, in the county of New York and State of New York, have invented or discovered certain new and useful Improvements in the Art of Producing Alumina, of which the following is a specification.

This invention relates to the art of manufacturing alumina (aluminum oxid, $Al_2O_3$) and has for its object the production of alumina of a grade adapted to be employed in the manufacture of metallic aluminum.

Instead of bauxite, heretofore commonly used in the production of alumina, we use, as the source of our alumina, the naturally occurring aluminum sulfate strongly contaminated with iron and which is plentifully found, as "alunogen" or "halotrichite," in certain sections of the West, as *e. g.* in Grant county, New Mexico. By simple lixiviation of this mineral with water a solution is formed containing alumina, iron (in the ferric and ferrous forms) and sulfuric acid in substantially the following proportions:

| | |
|---|---|
| $Al_2O_3$ | 15.36% |
| $Fe_2O_3$ | 4.28% |
| FeO | .54% |
| $SO_3$ | 30.94% |

The next step aims at the separation of the iron and this can be accomplished by following the procedure set forth in our application for an improvement in the art of producing sulfate of alumina, filed December 18, 1916, Serial No. 137,713. In general this procedure consists in the oxidation of the iron by means of ozone or ozonated air and the precipitation of the bulk of the iron by adding powdered carbonate of lime to the solution, the carbonate of lime being added slowly and the solution being constantly stirred during the addition of the precipitant. This operation is carried on until about 85% of the iron in solution has been precipitated as hydroxid when the precipitate may be removed by filtration.

After the iron hydroxid has been filtered off the filtrate is treated with a solution of caustic soda which will precipitate the remaining iron as hydroxid. This precipitate of iron hydroxid may then be filtered off and the resulting filtrate, which will consist of a pure solution of aluminum sulfate, may be evaporated until the boiling point of the solution is just short of 120 degree centigrade.

A solution of aluminum sulfate, boiling at a temperature just below 120° C., contains twelve molecules of water of crystallization, which water of crystallization can be driven off by heating the aluminum sulfate in a receptacle in which it is vigorously stirred while being heated, this stirring or agitation serving to break up any aluminum sulfate that tends to cake and adhere to the sides or bottom of the pot or receptacle when the material is heated.

From this receptacle the anhydrous aluminum sulfate is run into a calciner and heated to a temperature of approximately 550° to 650° centigrade, the calcination being preferably carried out in a furnace of the central flue type, in which the products of combustion do not come in contact with the material to be calcined. Under the action of the heat the sulfuric acid, excepting a slight trace, is driven off, a practically pure alumina, suitable for electrolytic reduction, remaining.

The cost of producing the alumina in accordance with our present invention or discovery may be reduced somewhat by utilizing the sulfuric acid which is driven off in the calcining operation. This passes over as sulfur dioxid ($SO_2$) and sulfur trioxid ($SO_3$) which may be converted back again into sulfuric acid by the well-known contact process.

Having thus described our invention or discovery we claim and desire to secure by Letters Patent:

1. The herein described process of producing substantially pure alumina, consisting in evaporating a solution of aluminum sulfate until the boiling point of the solution is just below 120° C., then subjecting such condensed solution to the action of heat while being agitated, thus producing anhydrous aluminum sulfate, and then calcining the said anhydrous sulfate at a temperature of approximately 550° to 650° C. in a suitable furnace.

2. The herein described process of producing substantially pure alumina, consisting in evaporating a solution of aluminum sulfate until the boiling point of the solution is just below 120° C., then subjecting such condensed solution to the action of heat while being agitated, thus producing anhydrous sulfate, then subjecting the latter to a temperature of approximately 550° to 650° C. in a suitable furnace, thus driving off, in a gaseous state, the sulfur contained in the aluminum sulfate, and then recovering this sulfur as sulfuric acid.

In testimony whereof we affix our signatures.

MAURICE BARNETT.
LOUIS BURGESS.